United States Patent
Grosser

[11] Patent Number: 5,184,158
[45] Date of Patent: Feb. 2, 1993

[54] GATE FOR MOTION PICTURE CAMERA

[75] Inventor: Claus Grosser, Freising, Fed. Rep. of Germany

[73] Assignee: Arnold & Richter Cine Technik GmbH & Co. Betriebs KG, Munich, Fed. Rep. of Germany

[21] Appl. No.: 692,224

[22] Filed: Apr. 26, 1991

[30] Foreign Application Priority Data

Apr. 26, 1990 [DE] Fed. Rep. of Germany ....... 4013909

[51] Int. Cl.⁵ .............................................. G03B 1/48
[52] U.S. Cl. .................................... 352/226; 352/224; 352/80; 352/45
[58] Field of Search ................. 352/226, 224, 221, 89, 352/45, 79, 80

[56] References Cited

U.S. PATENT DOCUMENTS

| | | | |
|---|---|---|---|
| 1,308,443 | 7/1919 | O'Hara | 352/221 |
| 1,869,852 | 8/1932 | Kindelmann | 352/226 |
| 1,981,033 | 11/1934 | Dina | 352/226 |
| 2,457,915 | 1/1949 | Nemeth | 352/226 |
| 2,617,327 | 11/1952 | D'Arcy | 352/224 |
| 2,885,925 | 5/1959 | La Vezzi | 352/226 |
| 4,390,257 | 6/1983 | Fernekes | |

FOREIGN PATENT DOCUMENTS 864050 1/1953 Fed. Rep. of Germany.
1093202 11/1960 Fed. Rep. of Germany.
7621110 10/1976 Fed. Rep. of Germany.

Primary Examiner—Monroe H. Hayes
Attorney, Agent, or Firm—Fish & Richardson

[57] ABSTRACT

Gate for motion picture cameras, through which a motion picture film is moved by means of a film transport mechanism. A device (30, 31, 32, 33) serves to receive a frame-type film format mask (4) whose frame window (40) is smaller than frame window (20).

10 Claims, 7 Drawing Sheets

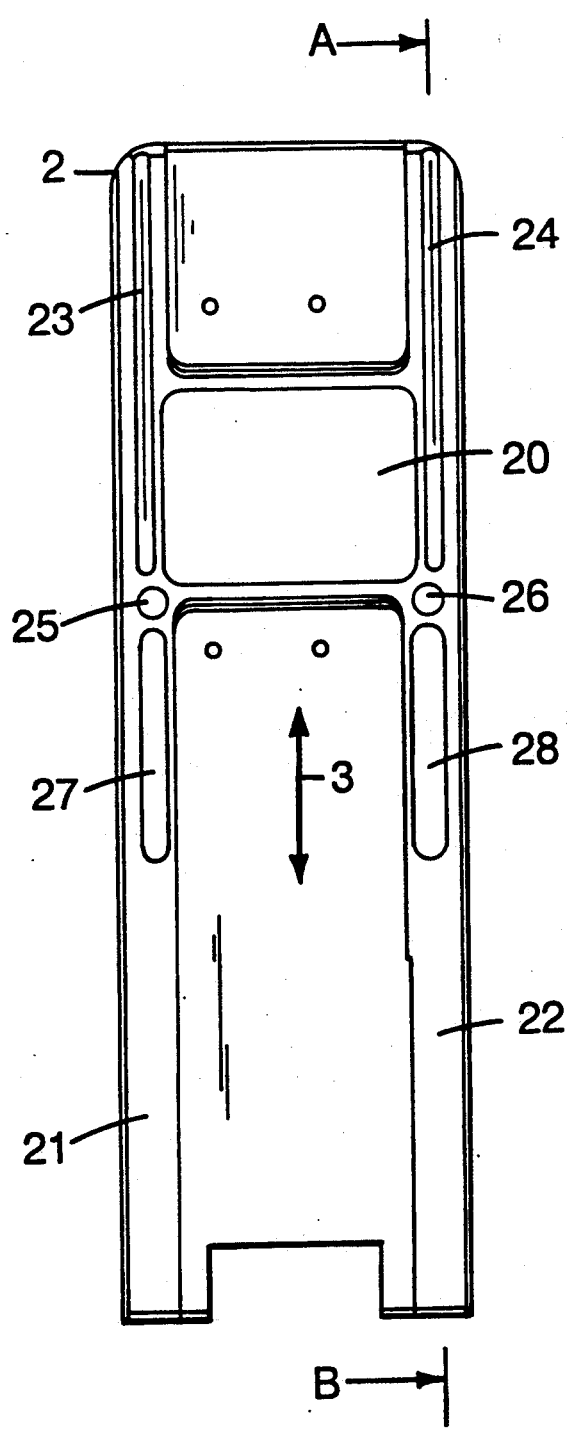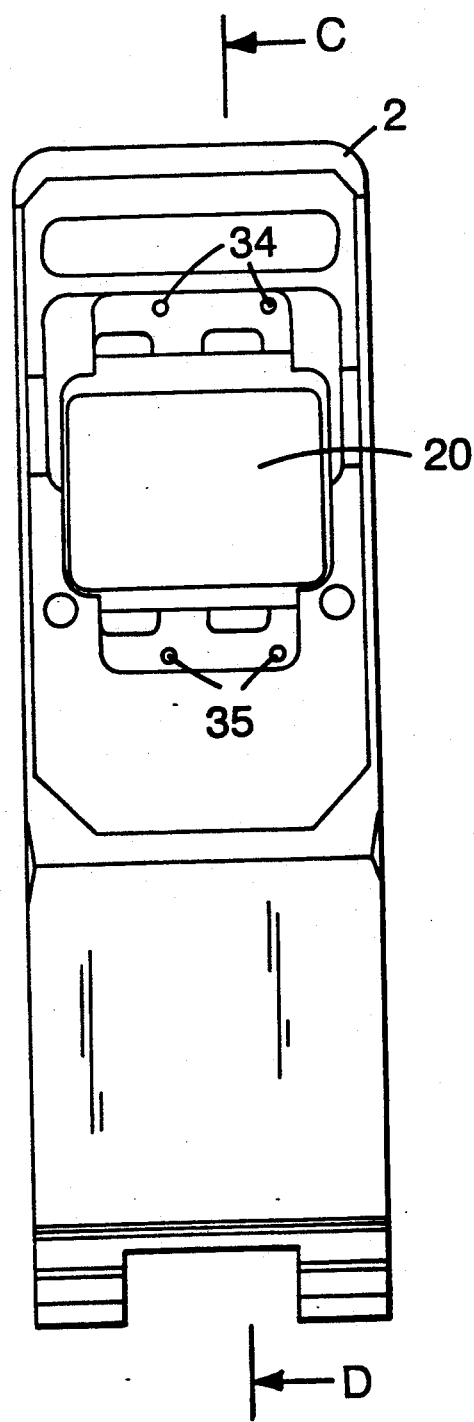
FIG. 3
FIG. 4

GATE FOR MOTION PICTURE CAMERA

The invention relates to a gate for motion picture cameras past which a motion picture film is moved by a film transport mechanism.

A gate is disposed in a film path on the optical axis of a motion picture camera in the light-incidence direction behind the camera lens and the shutter, past which gate a motion picture film is moved intermittently and illuminated during the times the shutter is open. Depending on the taking format of the motion picture film, gates with different gate openings are required so that different exposure areas of the motion picture film are exposed for a given film format. This makes it possible to use different taking formats with one type of camera for example with a motion picture camera designed for 35 mm formats.

However in order to change the taking format the gates for the different taking formats must be interchanged for which purpose after opening the camera housing, the claw block together with the film transport mechanism must be unfolded to replace the gate.

A problem consists in the fact that even with the closest adherence to the dimensions of the different gates for different taking formats, the distances as well as the alignment of the gates relative to the film transport mechanism vary slightly so that exact alignment of the film path relative to the film transport mechanism cannot be assured.

The same applies also to a film transport mechanism with a locking claw and transport claw.

Finally, there is also the risk that the gate will not be positioned exactly in the specified optical plane, so that especially when frequently changing gates for different taking formats, there will be a danger of lack of sharpness when exposing the motion picture film.

The goal of the present invention is to provide a gate for a motion picture camera which allows a change of the taking format without interchanging the gate and simultaneously ensures alignment of the film transport mechanism that remains constant for all taking formats, relative to the gate as well as constant film travel conditions under all circumstances, even with different taking formats.

The solution according to the invention permits the use of different taking formats without exchanging the gate and hence without cumbersome handling with the risk of damaging or contaminating the film channel. Another aspect is a constant, precise alignment of the film transport mechanism relative to the gate and constant film travel conditions, since the gate, remaining unchanged, always offers the same frictional conditions and constant alignment, even at different taking formats, since the film format mask is recessed and therefore does not influence the film travel conditions or the friction conditions.

Of course the gate can be removed for cleaning or other purposes. However to change a taking format it is merely necessary to exchange the film format mask without having to remove the gate from the camera housing.

One advantageous improvement on the solution according to the invention is characterized by the fact that the frame of the film format mask is arranged such that it is recessed from the film sliding surface of the gate.

This improvement on the solution according to the invention offers a considerable improvement relative to keeping the gate opening clean, since foreign bodies deposited on the film or transported by the film such as lint or the like cannot adhere to the frame edge of the taking format but stick stick at the edge of the gate, so that they cannot exercise any disturbing influence on the taking format.

When the gate or fixed-format gates are interchanged there is always the undesirable affect that lint adhering to the edge of the frame can be illuminated when the film is exposed and therefore moving pieces of lint can often be observed at the lower edge of the projected film.

This disturbing affect is effectively prevented by the solution according to the invention since in the taking format itself of the film format mask, no lint remains adhering but it is on the edge of the gate for taking the film format mask.

One advantageous embodiment of the solution according to the invention is characterized by the fact that the device for receiving the film format mask consists of a slot located on one side wall of the gate and an upper and lower guide channel running transversely to the film path, whereby a receiving groove provided parallel to the film travel path, is provided in the side wall opposite the slot, so that the film format mask is arranged in a fixed, defined position and arrangement relative to the gate.

One advantageous improvement on the solution according to the invention is characterized by the fact that the film format mask has a gripping tab projecting laterally from the slot when the film format mask is installed, on which a contact shoulder abutting the side wall of the gate is located.

The provision of a gripping tab projecting laterally out of the slot of the gate facilitates operation when exchanging film format masks and also ensures the use of whatever film format mask may be required, since the gripping tab simultaneously serves to label the taking format of the film format mask.

Another important advantage of the gripping tab consists in the fact that it provides a defined contact edge when the film format mask is inserted into the taking section of the gate.

By providing pressure springs in the upper and/or lower guide channels of the gate, secure reception of the film format mask in the gate is ensured, and at the same time easy exchange of the film format mask when changing the taking format is ensured as well.

Another advantageous embodiment of the solution according to the invention is characterized by the fact that a frame-type filter holder to receive a filter can be mounted on or in the film format mask. Preferably the filter holder has a gripping tab on which a button is provided which can be inserted into a recess in the gripping tab of the film format mask.

In this way, the film format mask simultaneously serves as a retaining medium to hold different filters, so that in addition to different taking formats, various filter elements may be inserted without a cumbersome replacement of the gate being necessary. The provision of a recess and a locking button ensures a precise alignment of the filter holder and film format mask as well as complete filling of the taking format by the filter.

In one advantageous improvement, the filter holder is made so that it can be unfolded, with the respective filter being insertable between the two halves of the filter holder. This ensures the use of a filter holder for different filter elements so that a simultaneously inexpensive solution is provided.

In one advantageous embodiment, a through hole is provided in the filter holder which is covered when the filter is inserted. In conjunction with a microswitch located in the camera housing, an optical signal can be fed into the camera finder which informs the user of the camera that a filter is in use. The through hole in the filter holder is covered by the filter element so that the microswitch cannot penetrate sufficiently far into the hole in the filter holder and therefore triggers the optical signal.

The idea that forms the basis of the invention will now be described in greater detail with reference to an embodiment shown in the drawing.

FIGS. 3 to 6 show the gate with a recess for a film format mask in various views and sections;

Figure 1:
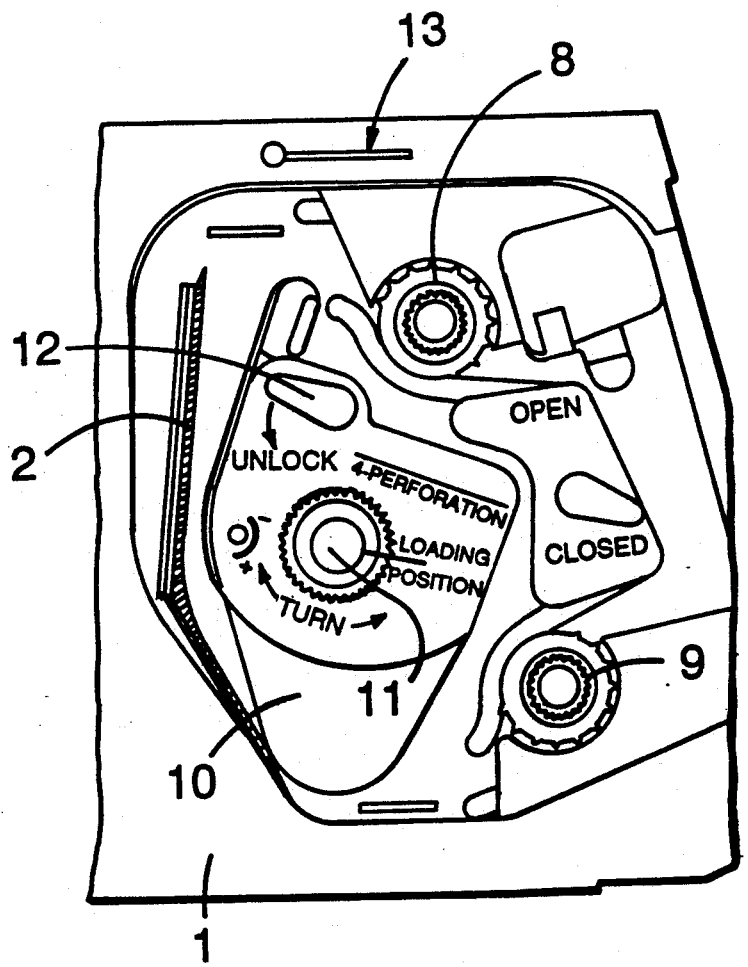
FIG. 1 is a schematic diagram of the arrangement of the gate in a camera housing.

The arrangement of a gate 2 shown in FIG. 1 in a camera housing 1 shows the arrangement of the gate 2 relative to the film transport mechanism which consists of a claw block 10 pivotably mounted in camera housing 1. Two film transport sprockets 8 and 9 serve for continuous transport of a motion picture film from a camera cassette, with film loops being formed between film transport sprockets 8 and 9 and the claw mechanism of the claw block, said loops equalizing the intermittent operation of the film transport mechanism relative to the continuous transport of film transport sprockets 8 and 9.

A knurled wheel 11 as well as levers 12 and 13 serve to release the claw block so that the latter can be pivoted for exchanging gate 2. Hence, removal of gate 2 is also basically possible even when using the solution according to the invention with the involvement of a film format mask for different taking formats.

For this purpose, knurled wheel 11 is rotated until a mark on it is lined up with a mark on claw block 10. Pressing lever 12 allows claw block 10 to pivot rearward and then, by turning knurled wheel 11 again, the claw tips in claw block 10 can be retracted as far as possible into the film path to avoid damage. By pulling lever 13, the gate can be unfolded in the direction indicated by the arrow in FIG. 1 and pulled upward out of the holder under slight pressure.

Figure 2:
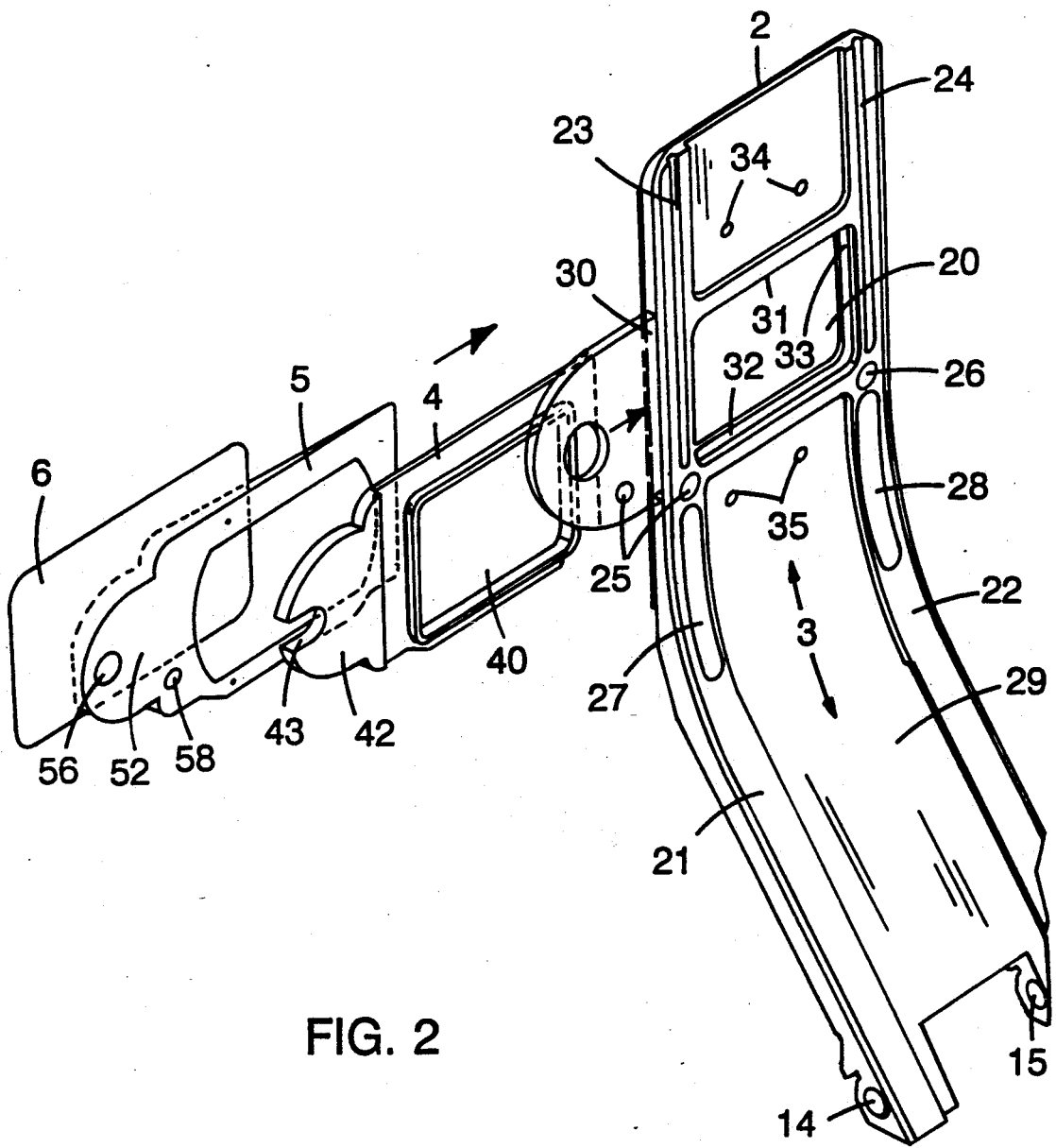
FIG. 2 is an exploded diagram of a gate, a film format mask, a filter holder, and a filter.
Figure 5:
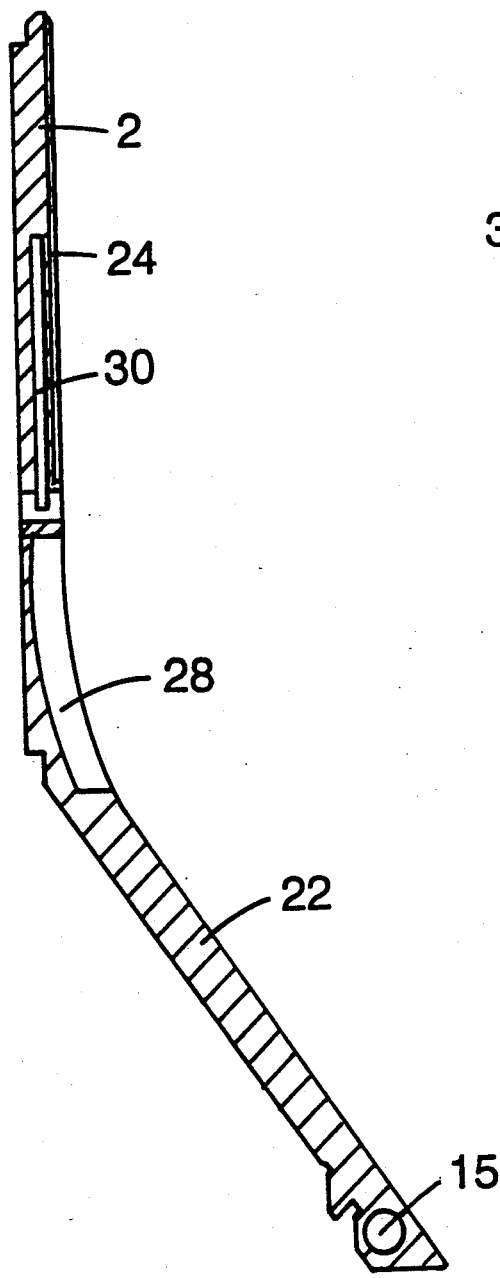
Figure 6:
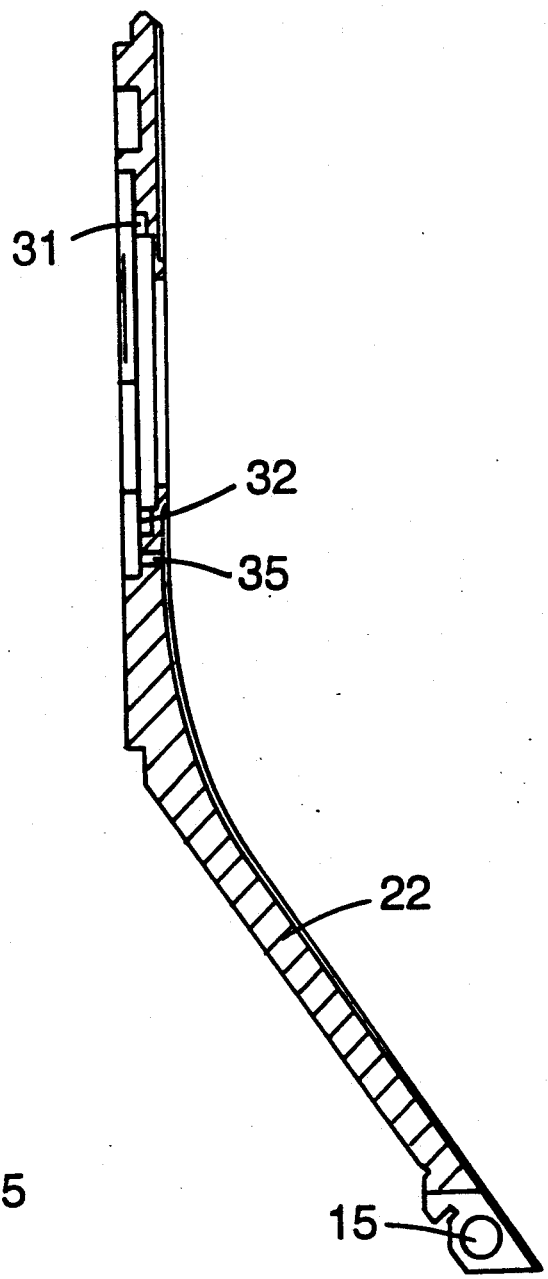

When inserting gate 2 into the camera housing, it is merely necessary to be sure that the spheres 14 and 15 under spring tension and located at the lower end of gate 2 engage precisely in holes in camera housing 1 as shown in FIG. 2.

According to FIG. 2, gate 2 which is bent in this embodiment has two lateral film guide wedges 21 and 22, along which the edge of the motion picture film with the perforations slides. A frame window 20 in gate 2 is on the optical axis of the camera and is exposed intermittently by the opening and closing of an iris shutter or a rotating circular shutter so that the motion picture film which is intermittently transported in film path 3 is illuminated in the vicinity of frame window 20.

A claw mechanism provided to transport the film has transport claws as well as locking claws which engage the film perforations or enter into it for a specified frame. Two grooves 27, 28 are provided for the transport claw tips in the film travel surface while below the frame window two holes 25 and 26 are provided into which the locking claw tips can enter.

In addition, in the vicinity of frame window 20 of gate 2, two additional grooves 23 and 24 are provided which improve the sliding movement of the motion picture film. The image area of the motion picture film does not come in contact with film travel surface 29 of gate 2, since it is depressed relative to lateral film guides 21 and 22. According to the invention, in one side wall of gate 2 in the vicinity of frame window 20 a slot 30 is provided as well as an upper and lower guide channel 31 and 32 and a lateral guide channel 33 located on the side wall of gate 2 opposite slot 30. Guide channels 31, 32, 33 and receiving slot 30 serve to receive a frame format mask 4 which has an asymmetric cross section so that it is protected against reverse insertion into the receptacle in gate 2 which is formed of slot 30 and guide channels 31, 32, and 33.

Film format mask 4 has a frame window 40 which determines the taking format of the frames. Therefore film format masks 4 with different taking formats can be used in a given type of camera while using the same frame window 2. The depressed arrangement of the film format mask 4 in the receptacle for gate 2 ensures that the frictional behavior in the film channel, in other words on the surface of gate 2, remains constant so that with different taking formats the same conditions always prevail during film transport.

As shown in particular in the schematic and perspective view in FIG. 2, during film transport the foreign bodies such as lint transported on the surface of the film are moved so that they always remain sticking to the edge of frame window 20 of gate 2 since the film format mask 4 is set back from the traveling surface of gate 2.

Film format mask 4 has a gripping tab 42 which serves to facilitate handling of the film format mask for inserting and removing it from the receptacle in gate 2, and also bears labeling for the respective taking format. Gripping tab 42 can be caused to be flush with a gripping tab 52 of the filter holder 5 which has a locking button 56 which can be inserted into a matching recess 43 in film format mask 4 so that a positive connection is ensured between film format mask 4 and filter holder 5.

Filter holder 5 consists of two halves joined together with one half being shown by dashed lines. By unfolding filter holder 5, a filter 6 can be inserted in filter holder 5.

When filter 6 is inserted, it covers up a through hole 58 provided in filter holder 5 so that a microswitch located in the camera housing in the vicinity of gate 2, when film format mask 4 and filter holder 5 with filter 6 have been inserted, cannot enter hole 58 and therefore, when the microswitch pin is not fully extended, triggers an optical signal which in particular can be fed to the camera finder and displayed on an LCD display, showing the user that a filter has been inserted.

To exchange the film format masks, claw block 10 as shown in FIG. 1 is pivoted rearward by pressing lever 12 after or before the film cassette has been removed. Then lever 13 is pulled and the gate tilted in the direction indicated by the arrow in FIG. 1. Then filter holder 5 as shown in FIG. 2 is pulled out laterally from gate 2 and then the film format mask is pressed against gripping tab 42 lightly in the direction of the lens mount of the camera and at the same time pulled out laterally. A new film format mask is inserted again in the reverse order.

Further details of the gate with the receptacle for the film format mask, filter holder, and device for holding the film format masks in the receptacle of the gate will now be described with reference to the figures below.

Figure 9:
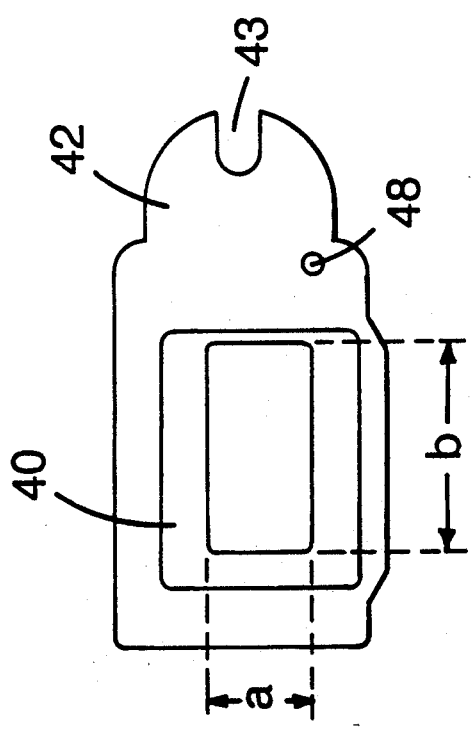
FIGS. 7 to 10 show a film format mask in different views and sections.
Figure 7:
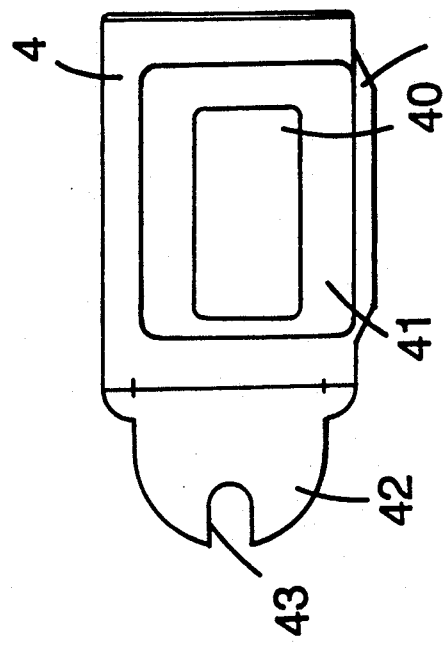

FIGS. 7 and 9 show a front and a rear view of film format mask 4. Film format mask 4 has a frame window 40 whose size is dimensioned as a function of the desired taking format. Each film format mask 4 has a frame window associated with it so that different format masks can be used in a given type of camera depending on the desired film format.

The taking format is determined by the lateral dimensions a and b of frame window 40 according to FIG. 9. The ratio of the sides of the reproduction format is derived accordingly and for example in the case of a taking format with a=18.6 mm and b=22 mm, a ratio of the image sides of 1:2.35 for Cinemascope formats or with a taking format of a=11.9 mm and b=22 mm, a frame side ratio of 1:1.85 for wide screen formats. Other formats include the normal format (ACAD.), Silent Universal, wide screen 1:1.66, Silent and Super 35 (1:2.35) and Super 35 (1:1.85) for a 35 mm camera, etc.

Figure 8:

Frame window 40 is surrounded by a frame 41 which, corresponding to the cross section in FIG. 8, is made elevated relative to the basic surface of film format mask 4 so that in conjunction with insertion of the gate, an exact arrangement between the film format mask 4 and the receptacle or gate 2 is ensured, thus eliminating insertion of film format mask 4 of the gate with the sides reversed.

A projecting side surface 44 of film format mask 4 serves to facilitate insertion of film format mask 4 into the receptacle in gate 2, into which it can be inserted against the pressure of a spring.

Gripping tab 42 of film format mask 4 serves firstly to facilitate handling of film format mask 4 when inserting and removing it from the receptacle in gate 2 and secondly for labeling to indicate the image window of the film format mask 4 in question. Recess 43 at the end of gripping tab 42 serves for connection with a matching button on the filter holder which is described and shown below.

Figure 10:

A contact edge 45 according to FIG. 10 serves for specified positioning of film format mask 4 on slot 30 of gate 2 so that exact alignment of film format mask 4 relative to the optical axis is ensured.

Figure 11:
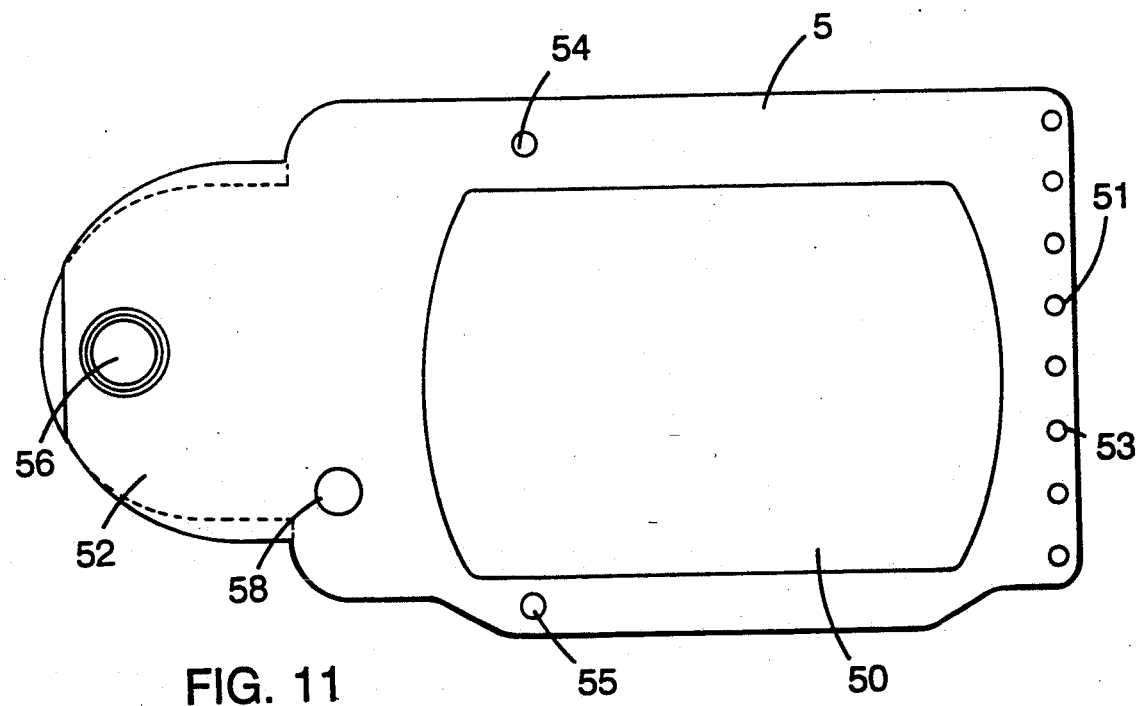
FIG. 11 is a top view of a filter holder.
Figure 12:
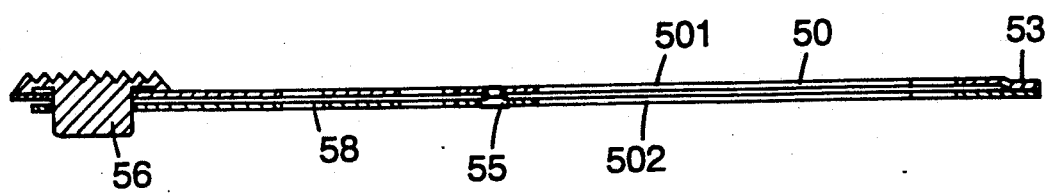
FIG. 12 is a lengthwise section through the filter holder according to FIG. 11.

FIG. 11 is a top view of the filter holder and FIG. 12 is a lengthwise section through the filter holder according to FIG. 11.

Filter holder 5 consists of two frame-type plates 501 and 502 connected together at end 51 of filter holder 5 by spot welds 53. On the side of gripping tab 52 of filter holder 5, the latter can be unfolded so that a filter can be inserted into filter holder 5. Two laterally disposed riveted connections 54, 55 serve for positive connection of the two plates 501 and 502 whether a filter is inserted or not. A button 56 serves for insertion into recess 43 of film format mask 4.

A through hole 58 is located near a microswitch when the filter holder is inserted, so that when the filter has been inserted the microswitch can penetrate for only a limited distance into through hole 58, but when the filter is not present it can penetrate all the way into hole 58 so that depending on whether a filter is inserted into filter holder 5, a display can be fed for example to the finder of the camera and an indication can be provided in the LCD display which informs the user whether or not a filter has been inserted.

Figure 13:
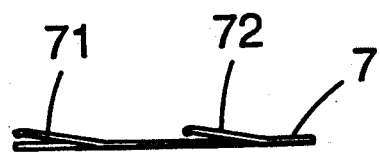
FIGS. 13 and 14 show a lengthwise section through a spring element and a top view of a spring element.
Figure 14:
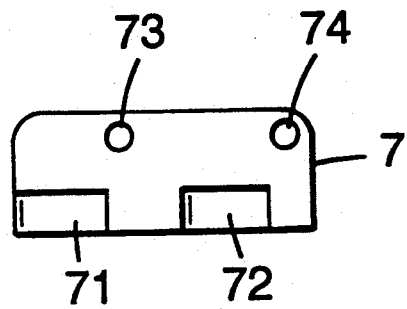

FIGS. 13 and 14 show a side view and a top view of a spring element which is used in gate 2 according to FIG. 2 above and below frame window 20 and can be fastened to threaded bores 34, 35 according to FIG. 2 by means of holes 73 and 74.

Spring element 7 has two projecting leaf springs 71, 72 against which the side edges of film format mask 4 press when inserted into receptacles 30, 31, 32, 33 of gate 2, thus resulting in a positive mounting of the film format mask into the receptacle of gate 2. Spring element 2 can be inserted unilaterally in the vicinity of an insertion channel 31 or 32 in the receptacle of the gate, or can be inserted on both sides.

The invention is not limited in its design to the preferred embodiment given above. Rather, a number of variations are possible which use the solution shown, even though the designs are quite different.

I claim:

1. A motion picture camera comprising film transport mechanism, film guide structure through which a motion picture film is moved by said film transport mechanism, and film guide structure having a film guide window and a sliding surface along which said motion picture film is moved by said film transport mechanism past said film guide window, and gate structure for disposition in said film guide structure, said gate structure comprising framelike film format mask structure that defines a frame window smaller than said film guide window, the frame of said film format mask being depressed relative to said sliding surface of said film guide structure to provide a lint trap region, said film guide structure including guide means for receiving said film format mask structure with said frame window in alignment with said guide window, said guide means including a slot on one side wall of said film guide structure, upper and lower guide channels extending transversely to the film path and a groove disposed opposite to said slot in the side wall of said film guide structure and extending parallel to the film path, said film format mask structure having a gripping tab which projects laterally out of said slot when the film format mask structure has been inserted in said guide means, and a support shoulder on said tab that is adapted to abut said side wall of said film guide structure.

2. The camera of claim 1 wherein said film format mask structure is of asymmetric cross section and said guide means for receiving said film format mask structure is matched to the asymmetric cross section of the film format mask structure.

3. The camera of claim 1 or 2 and further including a pressure spring disposed in at least one of said guide channels.

4. The camera of claim 4 and further including a frame-shaped filter holder for receiving a filter, said filter holder being mountable into said film format mask structure.

5. A motion picture camera comprising film transport mechanism, film guide structure through which a notion picture film is moved by said film transport mechanism, said film guide structure having a film guide window and sliding surface along which said motion picture film is moved by said film transport mechanism, and gate structure for disposition in said film guide structure, said gate structure comprising framelike film format mask structure that defines a frame window smaller than said film guide window, the frame of said film format mask being depressed relative to said sliding surface of said film guide structure, said film guide structure including guide means for receiving said film format mask structure with said frame member window in alignment with said guide window, said guide means including a slot on one side wall of said film guide structure, upper and lower guide channels extending transversely to the film path and a groove disposed opposite to said slot in the side wall of said film guide structure and extending parallel to the film path, said film format mask structure having a gripping tab which projects laterally out of said slot when the film format mask structure has been inserted in said guide means, and a support shoulder on said tab that is adapted to abut said side wall of said film guide structure, said gripping tab of said film format mask having a recess and further including a frame-shaped filter holder for receiving a filter, said filter holder being mountable into said film format mask structure, said filter holder being provided with a gripping tab, and a button disposed on said gripping tab of said holder, said button being insertable into said recess of said gripping tab of said film format mask.

6. The camera of claim 4 or 5 wherein said filter holder has two halves in foldable relation and said filter is insertable between the two halves of said filter holder.

7. The camera of claim 4 or 5 wherein said filter holder has a through hole which is covered when said filter is inserted in said filter holder.

8. The camera of claim 1 wherein a pressure spring is disposed in at least one of said guide channels, said film format mask is of asymmetric cross section, and said guide means for receiving said film format mask is matched to the asymmetric cross section of said film format mask.

9. A motion picture camera comprising film transport mechanism, film guide structure through which a motion picture film is moved by said film transport mechanism, said film guide structure having a film guide window and sliding surface along which said motion picture film is moved by said film transport mechanism, and gate structure for disposition in said film guide structure, said gate structure comprising framelike film format mask structure that defines a frame window smaller than said film guide window, the frame of said film format mask being depressed relative to said sliding surface of said film guide structure, said film guide structure including guide means for receiving said film format mask structure with said frame member window in alignment with said guide window, said guide means including a slot on one side wall of said film guide structure, upper and lower guide channels extending transversely to the film path and a groove disposed opposite to said slot in the side wall of said film guide structure and extending parallel to the film path, a pressure spring disposed in at least one of said guide channels, said film format mask structure, said format mask being of asymmetric cross section, and having a gripping tab which projects laterally out of said slot when the film format mask structure has been inserted in said guide means, said guide means for receiving said film format mask being matched to the asymmetric cross section of said film format mask, a support shoulder on said tab that is adapted to abut said side wall of said film guide structure, a frame-shaped filter holder adapted to be inserted into said film format mask, said filter holder having two halves in foldable relation, and a filter insertable between said two halves of said filter holder, said filter holder including a gripping tab on which a button is disposed, and having a through hole which is covered when said filter is inserted in said filter holder.

10. A motion picture camera comprising film transport mechanism, film guide structure through which a motion picture film is moved by said film transport mechanism, said film guide structure having a film guide window and sliding surface along which said motion picture film is moved by said film transport mechanism, and gate structure for disposition in said film guide structure, said gate structure comprising framelike film format mask structure that defines a frame window smaller than said film guide window, the frame of said film format mask being depressed relative to said sliding surface of said film guide structure, said film guide structure including guide means for receiving said film format mask structure with said frame member window in alignment with said guide window, said guide means including a slot on one side wall of said film guide structure, upper and lower guide channels extending transversely to the film path and a groove disposed opposite to said slot in the side wall of said film guide structure and extending parallel to the film path, said film format mask structure having a gripping tab which projects laterally out of said slot when the film format mask structure has been inserted in said guide means, and a support shoulder on said tab that is adapted to abut said side wall of said film guide structure, and a frame-shaped filter holder adapted to be inserted into said film format mask, said filter holder having two halves in foldable relation, and a filter which is insertable between said two halves of said filter holder, said filter holder having a through hole which is being covered when said filter is inserted in said filter holder, and a gripping tab on which a button is disposed, said button being insertable into a recess of the gripping tab of said film format mask.

* * * * *